(12) United States Patent  (10) Patent No.: US 7,504,079 B2
Kim et al.  (45) Date of Patent: Mar. 17, 2009

(54) VOL-OXIDIZER FOR SPENT NUCLEAR FUEL

(75) Inventors: Younghwan Kim, Daejeon (KR); Jisup Yoon, Daejeon (KR); Jaehoo Jung, Daejeon (KR); Donghee Hong, Daejeon (KR); Jaehyun Jin, Daejeon (KR)

(73) Assignees: Korea Atomic Energy Research Institute and Korea Hydro & Nuclear Power Co., Ltd, Daegeon (KR); Korea Hydro & Nuclear Power Co., Ltd., Seoul (KR)

( * ) Notice: Subject to any disclaimer, the term of this patent is extended or adjusted under 35 U.S.C. 154(b) by 427 days.

(21) Appl. No.: 11/483,711

(22) Filed: Jul. 10, 2006

(65) Prior Publication Data

US 2007/0110640 A1  May 17, 2007

(30) Foreign Application Priority Data

Nov. 15, 2005  (KR) .................... 10-2005-0109293

(51) Int. Cl.
*G21C 19/48* (2006.01)
*G21C 19/44* (2006.01)

(52) U.S. Cl. .................. 422/159; 422/903; 266/177; 976/DIG. 276; 976/DIG. 244

(58) Field of Classification Search ................ 422/159, 422/139, 140, 144, 903; 266/177; 976/DIG. 276, 976/DIG. 244
See application file for complete search history.

(56) References Cited

U.S. PATENT DOCUMENTS

| 4,225,560 A | * | 9/1980 | Nakanishi et al. ........... 422/159 |
| 4,343,478 A | * | 8/1982 | Morgan et al. .............. 277/385 |
| 4,565,670 A | * | 1/1986 | Miyazaki et al. ....... 422/186.04 |

* cited by examiner

*Primary Examiner*—Walter D Griffin
*Assistant Examiner*—Huy-Tram Nguyen
(74) *Attorney, Agent, or Firm*—Marshall, Gerstein & Borun LLP

(57) ABSTRACT

A vol-oxidizer of spent nuclear fuel, the spent nuclear fuel is injected to a reaction portion, the reaction portion is connected to a driving portion and oxidizes the spent nuclear fuel by rotating and back-rotating the spent nuclear fuel. The oxidized powder of the spent nuclear fuel is gathered in a discharge portion located in a lower portion of the reaction portion. By providing minute powder particles for recycling and a post process of the spent nuclear fuel, even though a size of an apparatus is small, processing a large amount is possible. Time required for oxidation can be reduced, and the powder is readily discharged by gravity since the apparatus is vertically configured.

22 Claims, 5 Drawing Sheets

VOL-OXIDIZER FOR SPENT NUCLEAR FUEL

CROSS-REFERENCE TO RELATED APPLICATION

This application claims the benefit of Korean Patent Application No. 10-2005-0109293, filed on Nov. 15, 2005, in the Korean Intellectual Property Office, the disclosure of which is incorporated herein by reference.

BACKGROUND OF THE INVENTION

1. Field of the Invention

The present invention relates to an apparatus providing minute powder particles for recycling of spent nuclear fuel, more particularly, an apparatus capable of processing a large amount of spent nuclear fuel even though its size is small, readily discharging a powder by gravity since the apparatus is vertically configured and reducing time required for oxidation.

2. Description of Related Art

Nuclear fuel is a material capable of producing energy by entering a nuclear reactor and causing a chain reaction of nuclear fission. Spent nuclear fuel is the material left after the nuclear fission.

Two methods are generally used for a management of spent nuclear fuel. One is a method of putting spent nuclear fuel in a rock bed in the ground to a depth of more than 500 meters and thoroughly isolating the spent nuclear fuel from the human ecosystem. This is known as permanent disposal. The other is a method of separating recyclable materials from spent nuclear fuel (this is referred to as 'reprocessing'), reusing the separated nuclear fuel materials, and permanently disposing of high-level radioactive waste.

According to a conventional method, spent nuclear fuel burnt in a nuclear power plant is stored in a water tank without being processed. However, the longer the period of nuclear power generation, the more an amount of spent nuclear fuel accumulates. Consequently, a huge storage space is needed. Also, the necessity and danger of disposing the accumulated nuclear wastes remains.

Accordingly, a stable management technology for recycling of nuclear fuel in a solid state is urgently desired and some process apparatuses have been developed. However an additional apparatus is required when powder is transferred to a subsequent process after a powdering is completed since apparatuses using conventional arts have a small capacity and positioned laterally or tilted. Also, when solid spent nuclear fuel is oxidized, it takes over thirteen hours, is not able to pass through a mesh, and remains on the mesh since oxidized powder of spent nuclear fuel has a property of sticking together when reacting to oxygen in the air.

Since a mixing vane used for mixing powder consists of different types of blades, when the solid spent nuclear fuel is injected, the rotating mixing vane collides with the solid spent nuclear fuel and is broken by its blade. Because of the broken vane, graphite in the spent nuclear fuel also breaks, so that a radioactive toxic gas leaks out, which brings about environmental pollution.

BRIEF SUMMARY

The present invention provides a vol-oxidizer capable of improving reaction efficiency by providing minute powder particles for a post processing for recycling of spent nuclear fuel.

The present invention also provides a vol-oxidizer which can process a huge amount of spent nuclear fuel even though its size is comparatively small and its structure is comparatively simple.

The present invention also provides a vol-oxidizer capable of readily discharging oxidized powder of spent nuclear fuel by gravity since the vol-oxidizer is vertically configured, smoothly providing minute powder particles of spent nuclear fuel and processing a large amount of powder.

The present invention also provides a vol-oxidizer of spent nuclear fuel in which powder is smoothly discharged since a mesh is able to rotate and transfer, so that time required for oxidation may be reduced, workers may be exposed to less danger while working, and environmental pollution may decrease.

According to an aspect of the present invention, there is provided a vol-oxidizer of spent nuclear fuel including a reaction portion, a driving portion and a discharge portion. Spent nuclear fuel is injected to the reaction portion and the driving portion is connected to the reaction portion and rotates and back-rotates the spent nuclear fuel injected into the reaction portion. Also, the discharge portion gathers the oxidized spent nuclear fuel in the reaction portion and guides the oxidized spent nuclear fuel to a subsequent process.

The reaction portion includes a reaction vessel forming a certain space inside; a heater enclosing the reaction vessel; a material injection tube connected to the reaction vessel and injecting the spent nuclear fuel to the reaction vessel; and a tube module including an air inlet connected to the reaction vessel and ventilating the reaction vessel. Also, the reaction vessel further includes a corn type metal filter mounted in a portion of the reaction vessel in which the reaction vessel's diameter becomes smaller and allowing air to ventilate by having micro holes.

The reaction vessel has a plurality of fixed mixing vanes protruding inward in regular intervals, and the plurality of vanes rotating, colliding with the spent nuclear fuel, so that reaction speed is increased.

The driving portion includes a rotation axle passing through the inside of the reaction vessel and moving up and down to selectively open or close a hole formed in a lower portion of the reaction vessel; a rotation driving portion rotating the rotation axle; and a transfer driving unit moving the axle up and down. A mesh mounted around the rotation axle in a cylindrical direction, the mesh includes a first mesh portion in a shape of a half circle; a second mesh portion adjacent to the first mesh portion and in a half circle; and a plurality of links connecting the first mesh portion, the second mesh portion, and the rotation axle; wherein the plurality of links are moved according to the rotation axle's transfer by an air cylinder to fold and open the first mesh portion and the second mesh portion.

The discharge portion includes a powder vessel located in a lower portion of the reaction portion and gathering descending oxidized spent nuclear fuel; and a valve located in an upper portion of the powder vessel and controlling an inlet of the spent nuclear fuel, and the powder vessel is a type of a inverted funnel and is detachably mounted.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
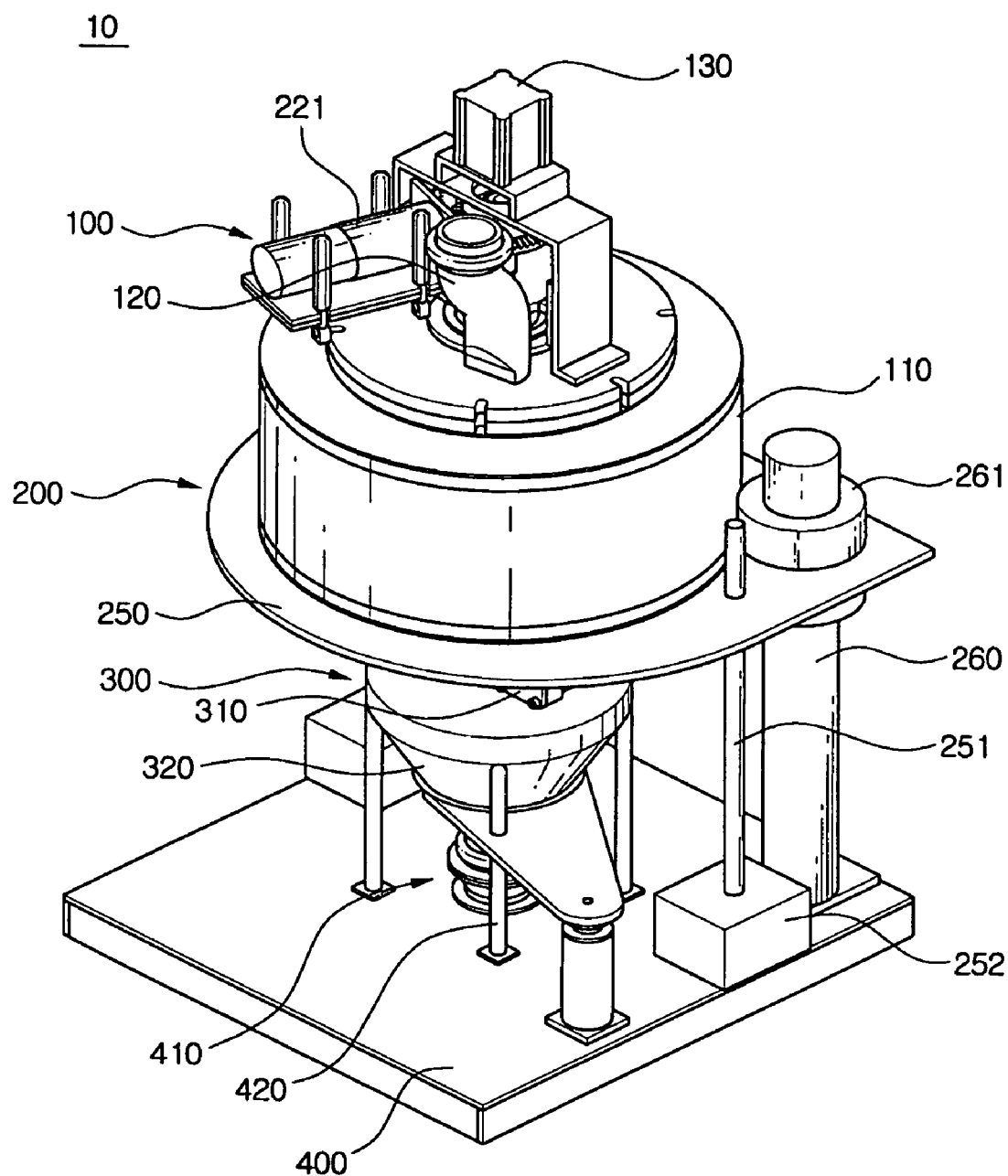
FIG. 1 is a perspective view illustrating a vol-oxidizer of spent nuclear fuel.

Reference will now be made in detail to embodiments of the present invention, examples of which are illustrated in the accompanying drawings, wherein like reference numerals refer to the like elements throughout. The embodiments are described below in order to explain the present invention by referring to the figures.

According to the present invention, there is provided a vol-oxidizer of nuclear fuel capable of improving reaction efficiency by providing with minute powder for a post process for recycling of spent nuclear fuel.

According to the present invention, there is provided a vol-oxidizer of nuclear fuel which can process a huge amount of spent nuclear fuel even though its size is comparatively small and its structure is comparatively simple.

According to the present invention, there is provided a vol-oxidizer of nuclear fuel in which powder is smoothly discharged since a mesh is able to rotate and transfer, so that time required for oxidation may be reduced, workers may be exposed to less danger while working, and environmental pollution may be decreased.

Figure 2:
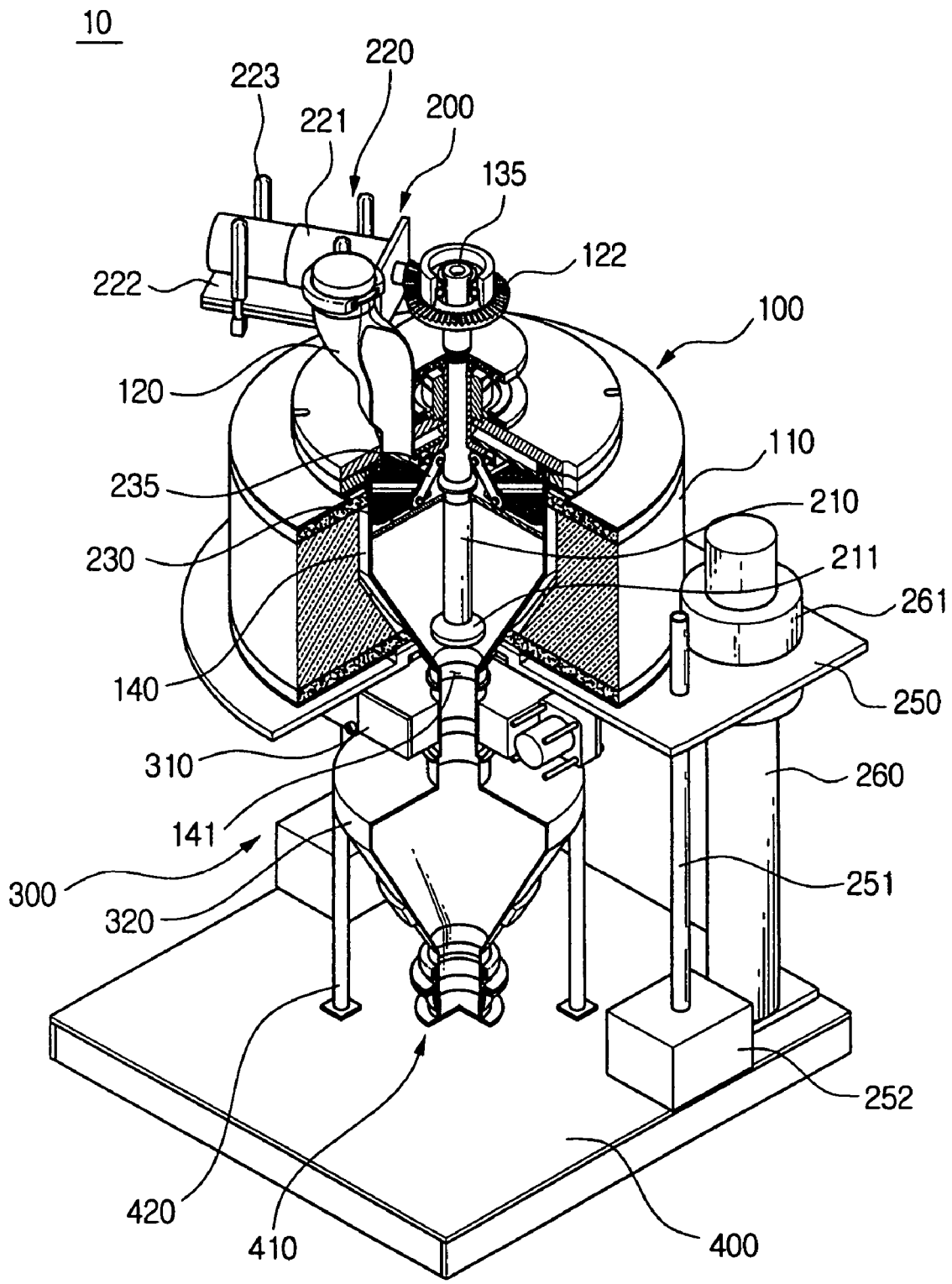
FIG. 2 is a perspective view illustrating a part of the vol-oxidizer of spent nuclear fuel according to the present invention.
Figure 3:
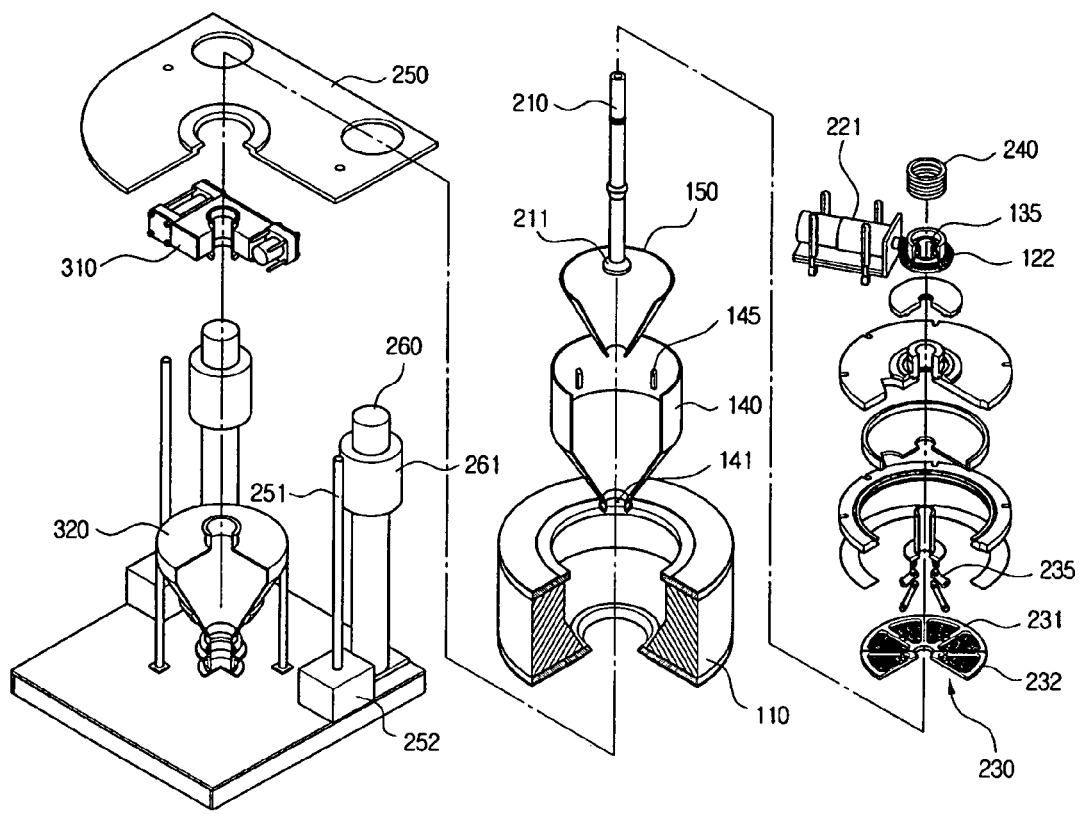
FIG. 3 is an exploded perspective view illustrating a part of vol-oxidizer of spent nuclear fuel.

FIG. 1 is a perspective view illustrating a vol-oxidizer of spent nuclear fuel;

FIG. 2 is a perspective view illustrating a part of the vol-oxidizer of spent nuclear fuel according to the present invention;

FIG. 3 is an exploded perspective view illustrating a part of vol-oxidizer of spent nuclear fuel. As illustrated in the figures, the vol-oxidizer 10 of spent nuclear fuel includes a reaction portion 100, a driving portion 200 and a discharge portion 300.

The reaction portion 100 is provided with a heater 110 in a shape of a doughnut having a certain space inside, a material injection tube where spent nuclear fuel and the like can be injected is mounted in an upper portion of the heater 110. Also, an air cylinder 130, having an air inlet 135, is mounted in the upper portion of the heater 110 in order to ventilate air inside the heater 110. The cylinder 130 opens and closes a mesh by moving a main axle up and down and opens and closes a discharge hole of a reaction vessel by the main axle.

The upper portion and a lower portion of the heater 110 is open, and a reaction vessel 140 is inserted to an inner space of the heater 110. A material is injected to an inside of the reaction vessel 140 through a material injection tube 120, the reaction vessel 140 has a discharge hole 141 formed in a lower portion of the reaction vessel 140 and the material is discharged to the discharge portion 300 after the material is oxidized. Numeral reference 240 in FIG. 4 is spring.

Figure 4:
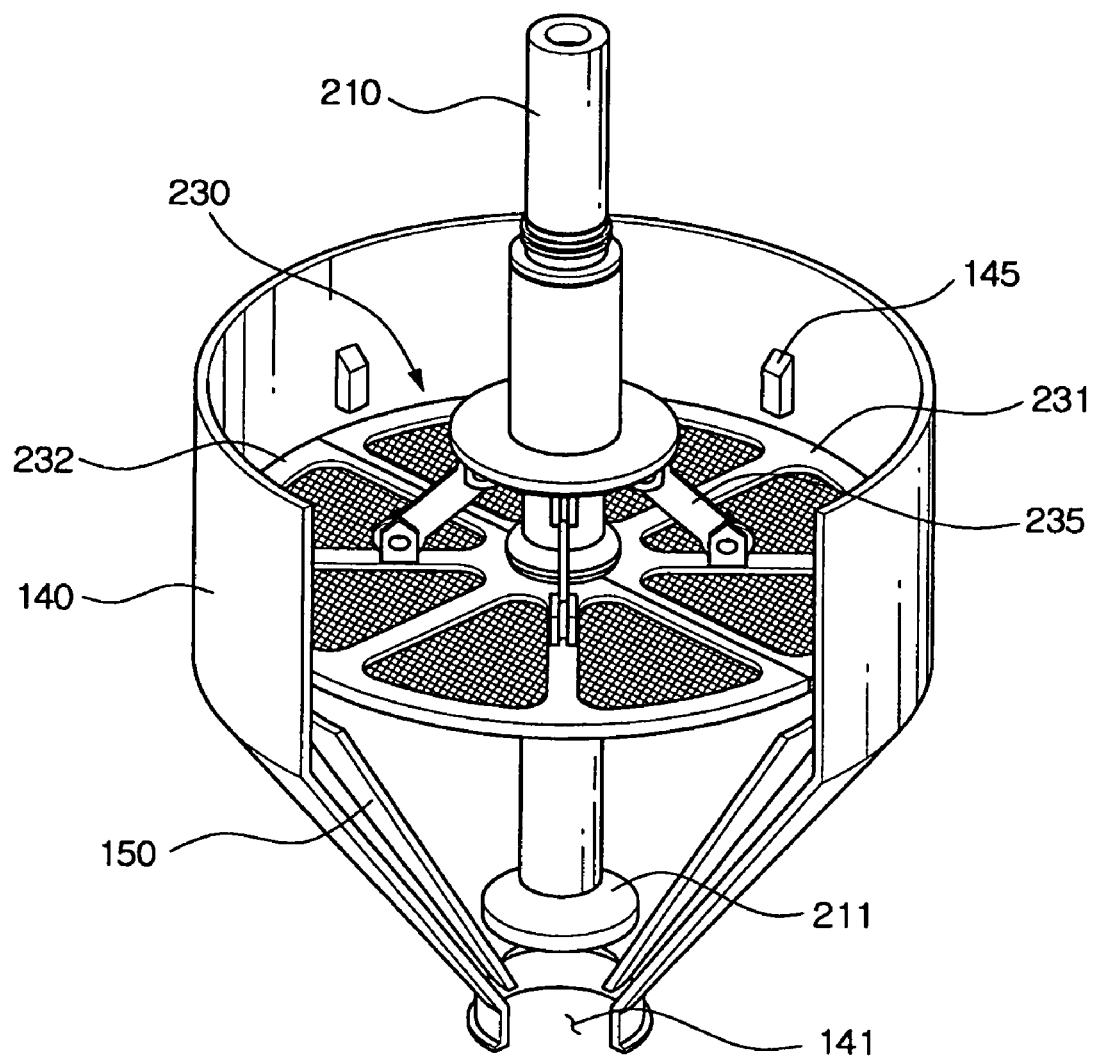
FIG. 4 is a perspective view illustrating a reaction vessel and mesh.

As illustrated in detail in FIG. 4, the reaction vessel 140 is connected to the inside of the heater 110 and is in a funnel shape, in which a cross section of an upper portion of the reaction vessel 140 has a regular circular diameter, and, from a certain upper portion to a lower portion of the funnel, the diameter of the funnel becomes smaller, and has a corn type metal filter 150 mounted in a portion of the reaction vessel 140 in which its' diameter becomes smaller. The corn type metal filter 150 has micro holes to ventilate air.

The inside of the reaction vessel 140 is preferably, but not limited to, manufactured in a size in which approximately 10 to 30 Kg of spent nuclear fuel powder may be injected and contained, the heater 110 may be heated to approximately 400 to 600 degrees C. and approximately 10 to 20 L/m of air is blown in through compressor.

The driving portion 200 helps oxidation by rotating and transferring the injected spent nuclear fuel and a configuration of the driving portion 200 will be illustrated in detail below.

The driving portion 200 includes a rotation axle 210 passing through inside the reaction vessel 140 and moved up and down to selectively open or close a discharge hole 141 formed in the lower portion of the reaction vessel. The rotation axle 210 has an expanded open and close portion 211 to close the discharge hole 141 and a lower portion of the rotation axle 210 is connected to the driving unit, so that the rotation axle 210 rotates.

The driving unit consists of a rotation motor 221 transferring a rotation force and a bevel gear 222 connected to the rotation motor 221 and the rotation axle 210. Namely, when the rotation motor 221 rotates, the rotation force is transferred to the rotation axle 210 through the bevel gear 222, so that the rotation axle 210 is able to rotate. The rotation motor 221 is stably mounted in a mounting plate 222 and is secured by a protruding guiding bar 223 formed from the motor mounting plate 222. The guiding bar 223 may rotate, so that the guiding bar is not an obstacle when the rotation motor is separated.

Also, the driving unit transfers the reaction portion 100, is provided with a driving axle 251 which is connected with a plate 250 located in a lower portion of the reaction portion 100, and is connected with a transfer motor 252. Further to a mechanism of transferring, when the transfers motor 252 operates, for example, the plate 250 transfers the driving axle 251 formed in a screw type and the reaction portion 100 connected on the plate 250 moves. In this case, the plate 250 stably transfers due to a guiding column 260. When the reaction portion 100 moves, a mesh 230 may be folded and open, which will be described below.

Figure 5:
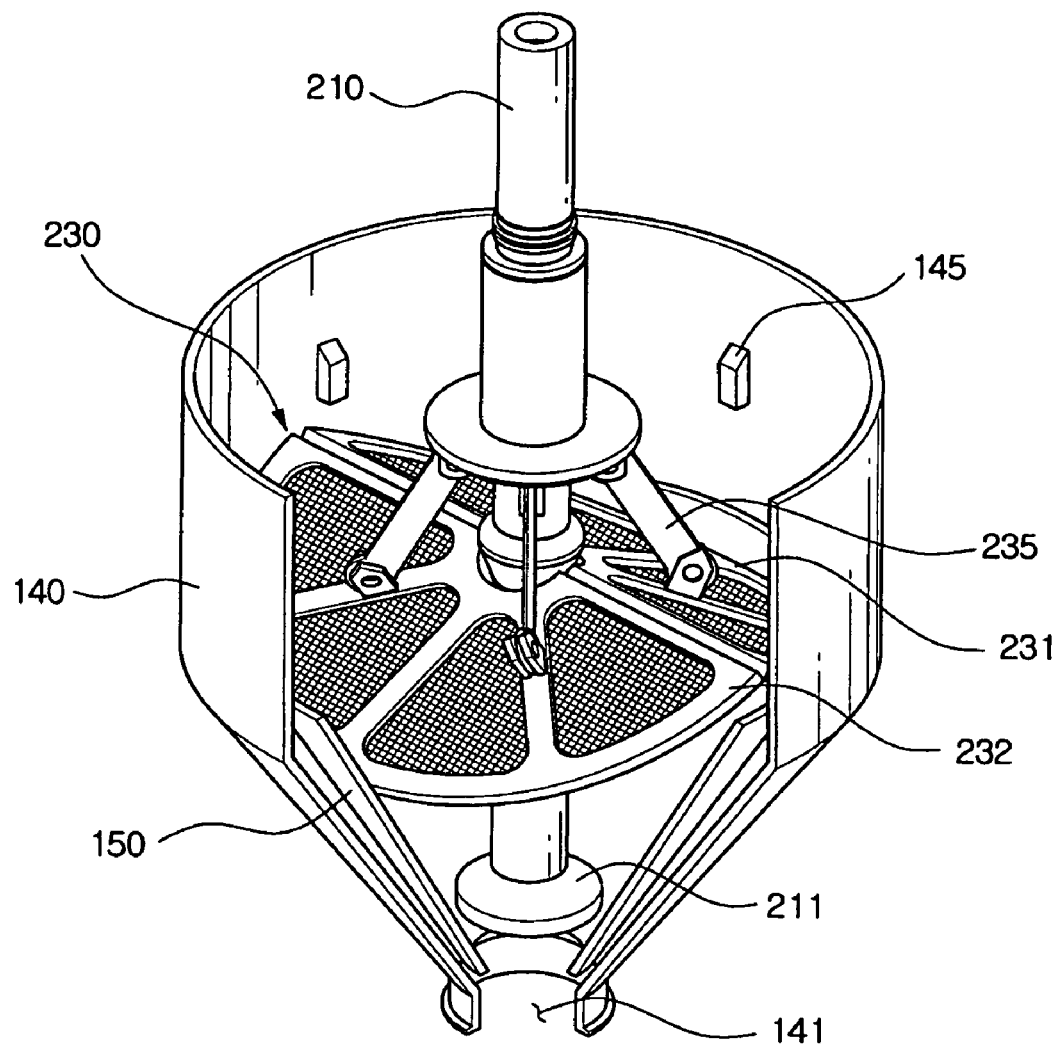
FIG. 5 is a perspective view illustrating movement of the mesh.

The mesh 230 is mounted around the rotation axle 230 in a cylindrical direction. The mesh 230 consists of a first mesh portion 231 and a second mesh portion 232 which is adjacent to the first mesh portion 231 and in a half circle. The first mesh portion 231 and the second mesh portion 232 are hinged together by the rotation axle 210 and a plurality of links 235, so that they are formed in umbrella ribs shape and are able to be folded downward, which is illustrated in FIG. 5. FIG. 5 is a perspective view illustrating the mesh portions folded downward.

With a rotation of the rotation axle 210, a material rotates on the mesh 230. In this case, the material collides with a fixed mixing vane 145 protruding from an inside wall of the reaction vessel 140 in regular intervals. The fixed mixing vane 145 consists of a plurality of vanes, stirs the material. Accordingly, the material may be easily mixed and air may be smoothly ventilated.

The discharge portion 300 consists of an open and close valve 310 mounted in the discharge hole 141 to control inflow and outflow of oxidized spent nuclear fuel, and a powder vessel 320 connected to the discharge hole 141 to store oxidized spent nuclear fuel. The open and close valve 310 may include all types of electronic and mechanical valves and be a normal two-way valve.

The powder vessel 320 is connected with the discharge hole 141 of the reaction vessel 140 and has a space which may store an oxidized powder of spent nuclear fuel inside the powder vessel 320. The powder vessel 320 is in a funnel shape and is detachably mounted on the vol-oxidizer 10. Accordingly, once oxidation is complete, the powder vessel 320 is separated from the vol-oxidizer and is moved to a subsequent process. By configuring for a continuous process by opening a lower portion of the powder vessel 320, the oxidized powder of spent nuclear fuel may be transferred to a tube and the like by passing through the lower portion of the powder vessel 320 for a post process.

The powder vessel 320 is attached to a bottom plate 400 by a holder 410 and consists of a plurality of columns 420 and the like, connected to the powder vessel 320.

Hereinafter, a driving mode and effect of the present invention will be illustrated.

Spent nuclear fuel is injected to the reaction vessel 140 through the material injection tube 120 and air is ventilated through a compressor mounted in the equipment. In this case, the spent nuclear fuel is located on the mesh 230. When the heater 110 is heated to approximately 500 degrees C. and approximately 14 L/m of air is blown in through compressor, the spent nuclear fuel is then oxidized to become a powder.

In order to accelerate oxidation speed, when the rotation motor 221 is driven, the rotation axle 210 rotates at a speed of approximately 3~5 RPM. Accordingly, the mesh 230 and the spent nuclear fuel on the mesh 230 rotates to collide with the fixed mixing vane 145 protruding from inside the reaction vessel 140. Also, since a corn type metal filter 150 allows air to ventilate, oxidation speed is increased by increasing a contact area between oxygen and the spent nuclear fuel.

Once oxidation of the spent nuclear fuel is completed, the air cylinder 130 is pulled upward. In this case, when the rotation axle 210 moves up, the mesh 230 is folded downward, and when a lower portion of the rotation axle 210 moves up, the oxidized powder of the spent nuclear fuel is transferred to the powder vessel 320. The gathered oxidized powder of the spent nuclear fuel may be transferred to a subsequent process.

Consequently, oxidized powder of spent nuclear fuel is readily discharged due to gravity since the vol-oxidizer 10 is vertically configured, minute powder particles of spent nuclear fuel is smoothly provided and a large amount of powder may be processed. Also, since a mesh is able to rotate and transfer, so that time required for oxidation may be reduced, workers may be exposed to less danger while working and environmental pollution may be decreased. Additionally, reaction efficiency may be improved by providing minute particles for a post process for recycling of spent nuclear fuel.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A vol-oxidizer of spent nuclear fuel, the vol-oxidizer comprising:
   a reaction portion in which spent nuclear fuel is being injected and oxidized;
   a driving portion connected to the reaction portion and moving up and down and rotating the injected spent nuclear fuel; and
   a discharge portion gathering the oxidized spent nuclear fuel in the reaction portion and guiding the oxidized spent nuclear fuel to a subsequent operation.

2. The vol-oxidizer of claim 1, the reaction portion comprising:
   a reaction vessel forming a certain space inside;
   a heater enclosing the reaction vessel;
   a material injection tube connected to the reaction vessel and injecting the spent nuclear fuel to the reaction vessel; and
   a tube module including an air inlet connected to the reaction vessel and ventilating the reaction vessel.

3. The vol-oxidizer of claim 2, wherein the reaction vessel is in a funnel shape, a cross section of an upper portion of the reaction vessel has a regular circular diameter, and, from a certain upper portion to a lower portion of the funnel, the diameter of the funnel becomes smaller.

4. The vol-oxidizer of claim 3, wherein the vol-oxidizer further comprises a corn type metal filter, mounted in a portion of the reaction vessel in which the reaction vessel's diameter becomes smaller and allows air to ventilate by having micro holes.

5. The vol-oxidizer of claim 2, wherein the reaction vessel has a plurality of fixed mixing vanes protruding inward in regular intervals, and the plurality of vanes rotating, colliding with the spent nuclear fuel.

6. The vol-oxidizer of claim 2, wherein the driving portion comprises:
   a rotation axle passing through the inside of the reaction vessel and moving up and down to selectively open or close a hole formed in a lower portion of the reaction vessel;
   a rotation driving unit rotating the rotation axle; and
   a transfer driving unit moving the axle up and down.

7. The vol-oxidizer of claim 6, wherein the vol-oxidizer further comprises a mesh mounted around the rotation axle and formed with a plurality of square holes.

8. The vol-oxidizer of claim 7, the mesh comprising:
   a first mesh portion in a shape of a half circle;
   a second mesh portion adjacent to the first mesh portion and in a half circle; and
   a plurality of links connecting the first mesh portion, the second mesh portion, and the rotation axle;
   wherein the plurality of links are moved according to the rotation axle's transfer by an air cylinder to fold and open the first mesh portion and the second mesh portion.

9. The vol-oxidizer of claim 6, the rotation driving unit comprising:
   a rotation motor generating a rotation force; and
   a gear unit connecting the rotation motor and the rotation axle.

10. The vol-oxidizer of claim 9, wherein the gear portion is a bevel gear and the rotation motor is mounted on a mounting plate protruded from a lateral face of the reaction portion and a plurality of protruding guiding bars are formed from the mounting plate around the rotation motor.

11. The vol-oxidizer of claim 6, the transfer driving unit comprising:
   a plate mounted with the reaction portion;
   a driving axle formed perpendicular to the plate;
   a guiding bar formed perpendicular to the plate and connected to the plate by a bearing; and
   a transfer motor moving up and down the driving axle.

12. The vol-oxidizer of claim 1, the discharge portion comprising:
   a powder vessel located in a lower portion of the reaction portion and gathering oxidized spent nuclear fuel; and
   a valve located in an upper portion of the powder vessel and controlling an inlet of the spent nuclear fuel.

13. The vol-oxidizer of claim 12, wherein the powder vessel is in a funnel shape and is detachably mounted.

14. A vol-oxidizer of spent nuclear fuel, the vol-oxidizer comprising:
   a bottom plate;
   a powder vessel detachably mounted on the bottom plate;
   a reaction vessel located in an upper portion of the powder vessel, oxidizing spent nuclear fuel and discharging the spent nuclear fuel to the powder vessel;
   a heater enclosing the reaction vessel and supplying the reaction vessel with heat;
   an injection tube injecting the spent nuclear fuel and air into the reaction vessel;
   a rotation axle passing through the reaction vessel;
   a mesh mounted around the rotation axle in a cylindrical direction and having the spent nuclear fuel being dropped into the reaction vessel and
   a driving unit driving the rotation axle to rotate and to move up and down.

15. The vol-oxidizer of claim 14, wherein the reaction vessel is in a funnel shape, a cross section of an upper portion of the reaction vessel has a regular circular diameter, and, from a certain upper portion to a lower portion of the funnel, the diameter of the funnel becomes smaller, and the vol-oxidizer has a corn type metal filter mounted in a portion of the reaction vessel in which the reaction vessel's diameter becomes smaller and allowing air to ventilate by having micro holes.

16. The vol-oxidizer of claim 14, the reaction vessel wherein the reaction vessel has a plurality of fixed mixing vanes protruding inward in regular intervals, and the plurality of vanes rotating, colliding with the spent nuclear fuel.

17. The vol-oxidizer of claim 14, the mesh comprising:
   a first mesh portion in a shape of a half circle;
   a second mesh portion adjacent to the first mesh portion and in a half circle; and
   a plurality of links connecting the first mesh portion, the second mesh portion, and the rotation axle;
   wherein the plurality of links are moved according to the rotation axle's transfer by an air cylinder to fold and open the first mesh portion and the second mesh portion.

18. The vol-oxidizer of claim 14, the driving unit comprising:
   a rotation motor generating a rotation force; and
   a gear unit connecting the rotation motor and the rotation axle.

19. The vol-oxidizer of claim 14, the driving unit comprising:
   a plate mounted with the reaction portion;
   a driving axle formed in a perpendicular direction and connected to the plate;
   a guiding bar formed in a perpendicular direction (*"from the plate"?*) and connected by the plate and a bearing; and
   a transfer motor moving the driving axle up and down.

20. The vol-oxidizer of claim 19, the vol-oxidizer further comprises a guiding bar formed between the bottom plate and the plate in a perpendicular direction, extending to connect the bottom plate and the plate and guiding the plate to move.

21. The vol-oxidizer of claim 14, wherein the powder vessel is in a funnel shape, in which an open and close valve is mounted in an inlet, and controls an inflow and outflow of the spent nuclear fuel.

22. The vol-oxidizer of claim 14, wherein the rotation axle is connected to the driving unit and an expanded open and close portion is formed in a lower portion of the vol-oxidizer.

* * * * *

UNITED STATES PATENT AND TRADEMARK OFFICE
CERTIFICATE OF CORRECTION

| | |
|---|---|
| PATENT NO. | : 7,504,079 B2 |
| APPLICATION NO. | : 11/483711 |
| DATED | : March 17, 2009 |
| INVENTOR(S) | : Younghwan Kim et al. |

It is certified that error appears in the above-identified patent and that said Letters Patent is hereby corrected as shown below:

In the Claims:

At Column 8, lines 18-19, delete "(*"from the plate"?*)".

Signed and Sealed this
Third Day of May, 2011

David J. Kappos
*Director of the United States Patent and Trademark Office*